United States Patent [19]
Albrecht

[11] Patent Number: 5,699,883
[45] Date of Patent: Dec. 23, 1997

[54] SPRING-APPLIED DUAL COIL BRAKE

[75] Inventor: James W. Albrecht, Dayton, Ohio

[73] Assignee: Stromag, Inc., Dayton, Ohio

[21] Appl. No.: 764,041

[22] Filed: Dec. 12, 1996

[51] Int. Cl.⁶ .......................... H02K 49/00; B60T 13/04
[52] U.S. Cl. ........................ 188/171; 188/158; 310/103
[58] Field of Search ........................ 188/72.1, 72.3,
188/156, 158, 159, 160, 161, 163, 171;
310/77, 103; 192/84.21, 84.31

[56] References Cited

U.S. PATENT DOCUMENTS

| | | | |
|---|---|---|---|
| 2,292,704 | 8/1942 | Lilliquist | 188/171 |
| 2,729,310 | 1/1956 | Tourneau | 188/171 |
| 3,665,231 | 5/1972 | Weudler | 310/77 |
| 3,752,267 | 8/1973 | Dovell et al. | 188/171 |
| 4,049,089 | 9/1977 | Rundle | 188/171 |
| 4,156,478 | 5/1979 | Kroeger | 188/171 |
| 4,567,967 | 2/1986 | Crosswair | 188/72.3 |
| 5,057,728 | 10/1991 | Dammeyer et al. | 310/77 |
| 5,154,261 | 10/1992 | Tanaka et al. | 188/161 |

Primary Examiner—Douglas C. Butler
Assistant Examiner—Chris Schwartz
Attorney, Agent, or Firm—James E. Bradley

[57] ABSTRACT

A variable electric brake assembly applies braking force to the wheel of a materials handling vehicle through a rotor shaft. A brake rotor rotates on the rotor shaft and is located within the brake assembly. When the vehicle is in a parked position, both an inner coil and an outer coil are de-energized. With the inner coil de-energized, an inner armature is not attracted to the inner coil, and the inner armature is forced against the brake rotor by springs to prevent the rotation of the brake rotor. When the vehicle is moving in a free running position, the outer coil remains de-energized while the inner coil is energized. With the inner coil energized, the inner armature is attracted to the inner coil and overcomes the force of the springs, thereby allowing the brake rotor to freely rotate. When the vehicle undergoes dynamic braking, both the outer coil and the inner coil are energized. When the outer coil is variably energized, the outer armature is variably attracted to the outer coil to apply a variable dynamic braking force to the brake rotor.

14 Claims, 2 Drawing Sheets 5,699,883

SPRING-APPLIED DUAL COIL BRAKE

TECHNICAL FIELD

This invention relates in general to automotive braking systems, and in particular to electric braking assemblies for materials handling vehicles.

BACKGROUND ART

In materials handling vehicles, such as fork lift trucks, it is desirable to vary the amount of braking force applied. Hydraulic brakes provide for great flexibility in the amount of braking force applied, but hydraulic brake systems are expensive because of the required space for hardware and plumbing. Electric brakes are frequently used in materials handling vehicles, particularly electrically powered vehicles, because of their size and simplicity. However, electric brakes normally do not lend themselves to being variable in the braking force applied, and they require separate parking and dynamic braking assemblies. It is desirable for the braking force to be varied to some extent to accommodate the braking requirement, and to minimize the size and cost of the braking system.

DISCLOSURE OF THE INVENTION

A variable electric braking system has a front plate attached to a housing with a plurality of screws. The housing and the front plate have central bores for accommodating a rotor shaft which extends from and rotates with a wheel on a vehicle. A brake rotor rotates with the rotor shaft within the brake assembly.

The housing contains inner and outer coils which are radially spaced apart. The coils are immediately adjacent to and communicate with an inner and an outer armature, respectively. The inner and outer armatures are secured to the housing and to the brake rotor, respectively, by a plurality of dowel pins. The dowel pins associated with the inner armature prevent the inner armature from rotating relative to the coils, but allow the inner armature to move axially. The dowel pins associated with the outer armature prevent the outer armature and the rotor from rotating relative to each other, but allow the outer armature to move axially relative to the rotor. The housing contains a plurality of springs which urge the inner armature toward the brake rotor. The brake assembly also has brake pads which enhance its braking efficiency.

The brake assembly has three modes of operation. The first mode of operation is a parking brake position. In this position, both coils are de-energized. When the outer coil is de-energized, the outer armature is unattracted to the outer coil and, thus, the brake rotor is unimpeded by frictional engagement of the outer armature against the coil housing. When the inner coil is de-energized, the inner armature is unattracted to the inner coil, which allows the springs to apply pressure to the inner armature, which in turn applies an axial braking force to the brake rotor. The second mode of operation is a free running position. In this mode, the inner coil is energized while the outer coil remains de-energized. When the inner coil is energized, the inner armature is sufficiently attracted to the inner coil to overcome the force of the springs, removing the axial force on the brake rotor to allow the brake rotor to freely rotate. The third mode of operation is a dynamic braking position. In this mode, the outer coil is variably energized while the inner coil remains energized. When the outer coil is variably energized, the outer armature is variably attracted to it, thereby applying variable braking force to the outer armature. Because the brake rotor and the outer armature are locked for rotation together, the brake force is applied to the brake rotor.

BEST MODE FOR CARRYING OUT THE INVENTION

Figure 1:
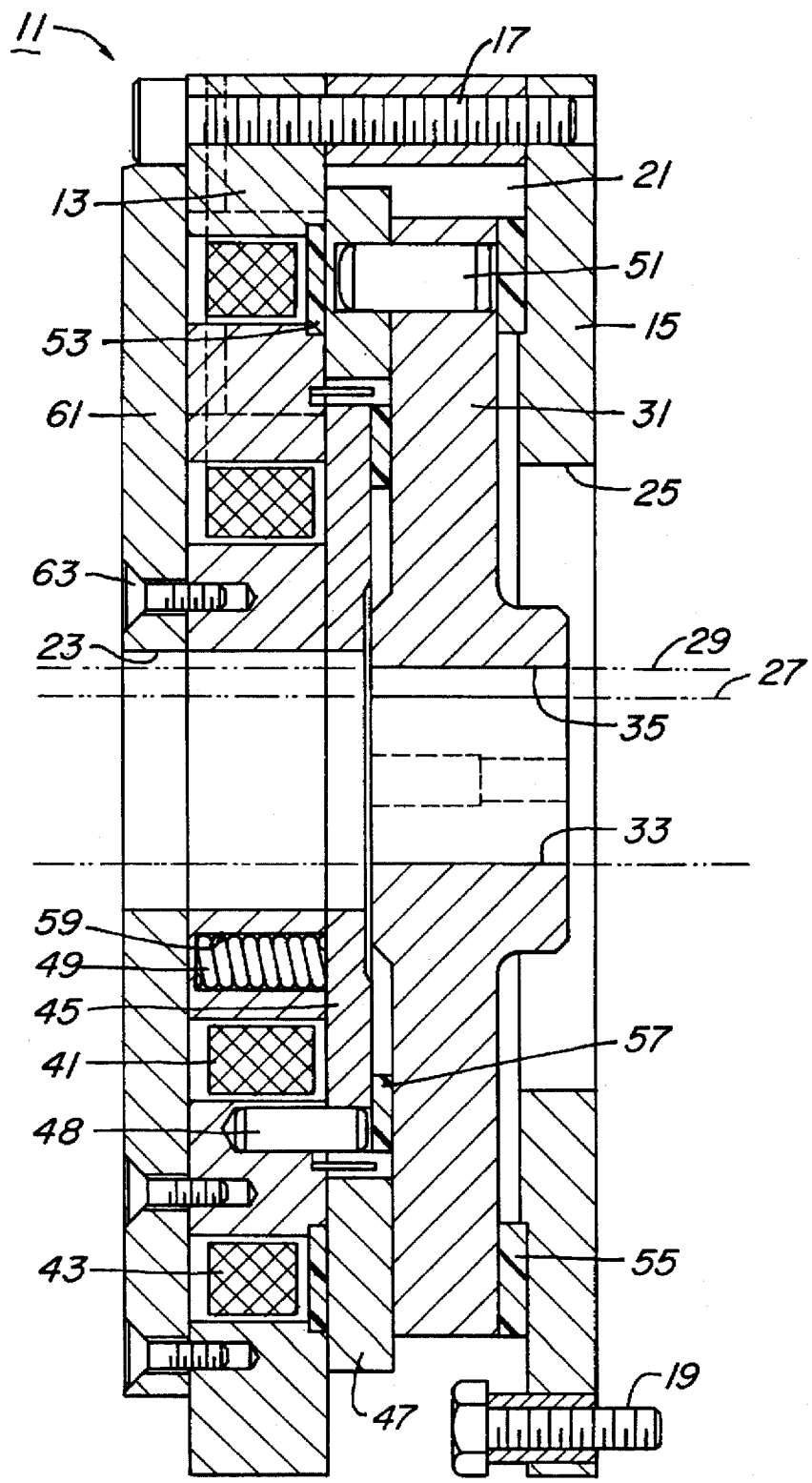
FIG. 1 is a sectional side view of a braking system constructed in accordance with the invention.
Figure 2:
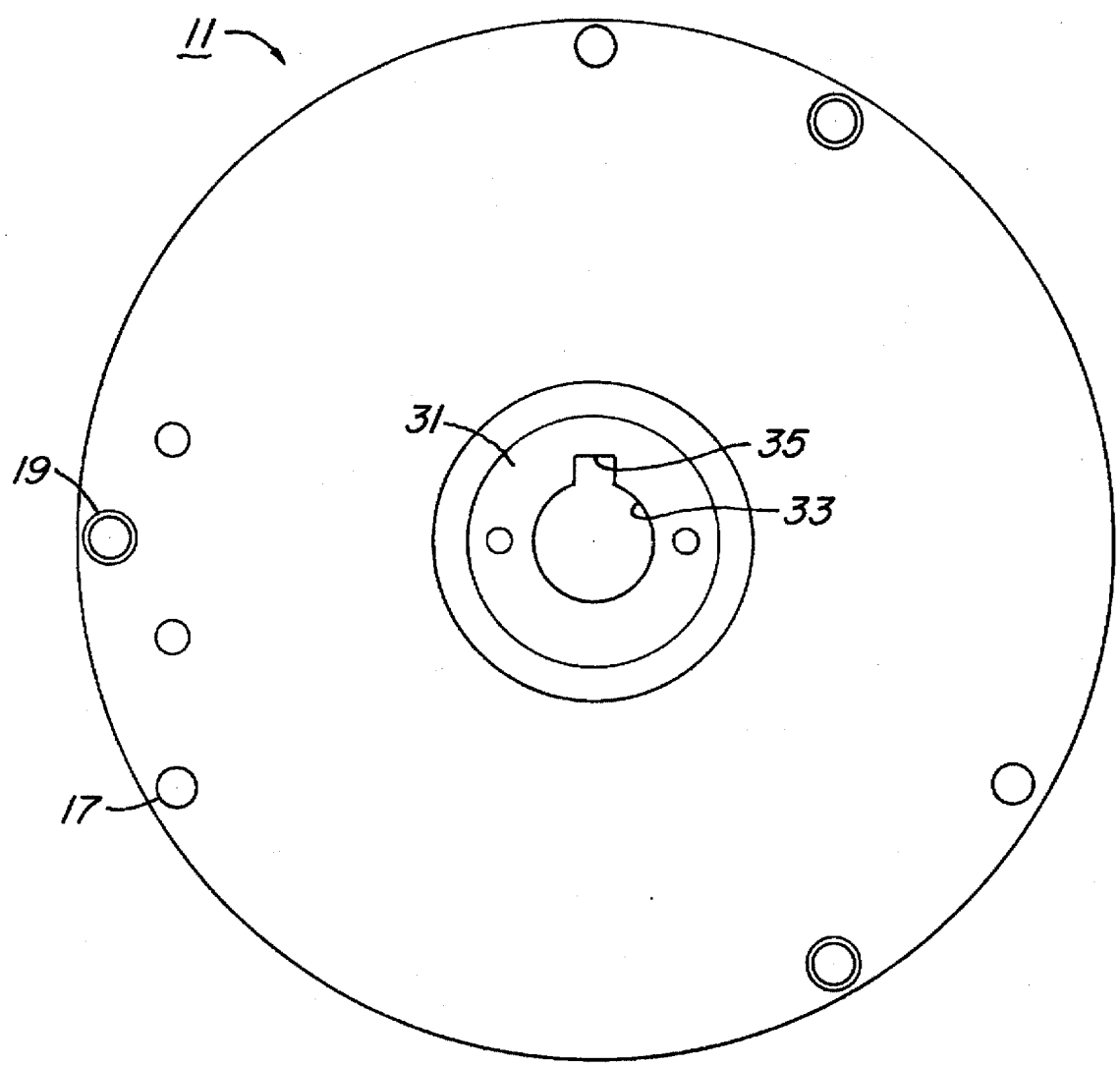
FIG. 2 is a front view of the braking system in FIG. 1 without the rotor shaft attached.

Referring to FIG. 1, a variable electric braking system 11 with a housing 13 is shown. A front plate 15 is attached to a front side of housing 13 with a plurality of screws 17. Braking system 11 also has a plurality of screws 19 for attachment to a vehicle (not shown). Housing 13 and front plate 15 have central bores 23 and 25, respectively, for accommodating a splined rotor shaft 27 which extends from and rotates with a wheel (not shown) on a vehicle (not shown). Shaft 27 is rotatable relative to housing 13 and front plate 15. A cylindrical brake rotor 31 rotates with rotor shaft 27 within a cavity 21 between housing 13 and from plate 15. Referring to FIG. 2, brake rotor 31 has a central hole 33 for receiving rotor shaft 27. Torque is transmitted from rotor shaft 27 to brake rotor 31 through a spline 29 on rotor shaft 27 which fits within a slot 35 in brake rotor 31. There is a small amount of axial lash or play between housing 13, front plate 15 and rotor 31 which allows axial movement of rotor 31 relative to housing 13 and from plate 15.

Referring back to FIG. 1, housing 13 contains an inner electromagnetic device or coil 41 and an outer electromagnetic device or coil 43. Coils 41 and 43 are concentric with shaft 27 although outer coil 43 is radially outward from inner coil 41. A source of electrical power (not shown) will selectively energize coils 41 and 43 independently from each other. Inner coil 41 and outer coil 43 are immediately adjacent to an inner armature 45 and an outer armature 47, respectively, which are located between housing 13 and rotor 31. Inner armature 45 and outer armature 47 are annular in shape and formed from a ferrous material. Inner armature 45 is located within a central hole in outer armature 47 and is axially moveable relative to outer armature 47. Inner armature 45 is secured to housing 13 by a plurality of dowel pins 48 which prevent inner armature 45 from rotating relative to housing 13, but allow inner armature 45 to move axially relative to housing 13 and rotor 31. Outer armature 47 is also rotationally secured to brake rotor 31 with dowel pins 51, making outer armature 47 rotatable relative to inner armature 45. Dowel pins 51 prevent outer armature 47 from rotating relative to brake rotor 31, but allow outer armature 47 to move axially relative to brake rotor 31 and housing 13. Housing 13 contains a plurality of slots 59 (only one shown) which contain a corresponding number of coil springs 49. Springs 49 apply an axial force to inner armature 45 to urge it toward brake rotor 31. Springs 49 do not engage outer armature 47.

Brake assembly 11 has three annular brake pads which enhance its braking efficiency. A first or dynamic brake pad 53 is located between housing 13 and outer armature 47, and is adjacent to outer coil 43. Brake pad 53 is used exclusively for dynamic braking and is secured to either outer armature 47 or housing 13 as shown. A second or parking brake pad 55 is located between front plate 15 and brake rotor 31, while a third or parking brake pad 57 is located between inner armature 45 and brake rotor 31. Both brake pad 55 and brake pad 57 are used exclusively for static braking. Brake pad 55 is stationarily mounted to either rotor 31 or from plate 15. Brake pad 57 is stationarily mounted to either rotor 31 or inner armature 45.

Brake assembly 11 has three modes of operation which may be selected by the vehicle operator. The first mode of operation is a static or parking brake position. The parking brake position is used when the vehicle is not moving and the operator desires to lock the vehicle against movement from a stationary position. When the parking brake position is selected, both inner coil 41 and outer coil 43 are in an unexcited or de-energized state. When inner coil 41 is de-energized, inner armature 45 is unattracted to inner coil 41. Without this restraint, springs 49 apply axial force to inner armature 45, thereby applying braking force to brake rotor 31 through static brake pad 57. The axial force of springs 49 also urges rotor 31 against brake pads 55. When outer coil 43 is de-energized, outer armature 47 is unattracted to outer coil 43, and outer armature 47 will not be forced against brake pad 53. Consequently, brake pad 53 performs no parking brake function.

The second mode of operation is a free running position with no braking force being applied to brake rotor 31. In this mode, inner coil 41 is energized, while outer coil 43 remains de-energized as described for the parking brake position. When inner coil 41 is energized, inner armature 45 is sufficiently attracted to inner coil 41 to overcome the force exerted by springs 49 on inner armature 45. Inner armature 45 shifts axially slightly toward housing 13. Rotor 31 shifts axially slightly away from front plate 15. Springs 49 will not exert a force on static brake pads 55 and 57, thereby allowing brake rotor 31 to freely rotate.

The third mode of operation which may be selected by the vehicle operator is a variable dynamic braking position. In this mode, outer coil 43 is variably energized, while inner coil 41 remains energized as described in the free running position. When outer coil 43 is variably energized, outer armature 47 is variably attracted to it and moves slightly toward housing 13, thereby applying variable braking force to brake rotor 31 through brake pad 53. Dowel pins 51 cause the braking force on armature 47 to be applied to rotor 31. The amount of force applied by outer armature 47 to brake pad 53 varies depending upon the voltage supplied to outer coil 43. Pads 55 and 57 do not have any dynamic braking function.

Brake assembly 11 also has a back plate 61 which is attached to a back side of housing 13 with a plurality of screws 63. Back plate 61 is composed of a material which eliminates residual magnetic forces between outer armature 47 and outer coil 43 after outer coil 43 has been de-energized. Without back plate 61, residual magnetic forces would cause a slight braking force to be applied to brake rotor 31 in the free running position.

In operation, brake assembly 11 is attached to the wheel of a vehicle (not shown) through rotor shaft 27. Brake rotor 31 rotates on rotor shaft 27 and is located within brake assembly 11 between housing 13 and front plate 15. When the vehicle is in a parked position, both inner coil 41 and outer coil 43 are de-energized. With inner coil 41 de-energized, inner armature 45 is not attracted to inner coil 41, but is forced against brake rotor 31 by springs 49. This forces rotor 31 against static brake pad 55 and front plate 15 to prevent the rotation of brake rotor 31. When the vehicle is moving in a free running position, outer coil 43 remains de-energized while inner coil 41 is energized. With inner coil 41 energized, inner armature 45 is attracted to inner coil 41 and overcomes the force of springs 49, thereby allowing brake rotor 31 to freely rotate. Finally, when the vehicle undergoes dynamic braking, both outer coil 43 and inner coil 41 are energized. When outer coil 43 is variably energized, outer armature 47 is variably attracted to outer coil 43 to apply variable dynamic braking force to brake rotor 31 through dynamic brake pad 53.

The invention has significant advantages. Both the parking brake and the variable dynamic brake are contained within a single brake assembly. In this configuration, braking system size and cost are saved over prior art devices requiring separate parking and dynamic braking assemblies.

While the invention has been shown in only one of its forms, it should be apparent to those skilled in the art that it is not so limited, but is susceptible to various changes without departing from the scope of the invention.

I claim:

1. An electric brake assembly, comprising in combination:
   a stationary housing;
   a rotary shaft having an axis;
   a brake rotor mounted on the rotary shaft for rotation therewith;
   a static brake armature secured to the housing to prevent rotation therebetween, the static brake armature being free to move axially relative to the housing and the rotor;
   a spring between the housing and the static brake armature for urging the static brake armature away from the housing and against the rotor to frictionally engage the rotor and prevent rotation of the rotor relative to the housing;
   a dynamic brake armature secured to the rotor for rotation therewith, the dynamic brake armature being free to move axially relative to the rotor and the housing;
   an electromagnetic first coil stationarily mounted to the housing for drawing the dynamic brake armature frictionally against the housing when energized to apply a braking force to the rotor;
   an electromagnetic second coil stationarily mounted to the housing for urging the static brake armature toward the housing when energized to compress the spring and pull the static brake armature away from the rotor; and
   means for selectively energizing the first coil and the second coil for providing a dynamic braking force when the first coil is energized, an absence of braking force when the first coil is de-energized and the second coil is energized, and a parking brake force when both of the coils are de-energized.

2. The brake assembly according to claim 1 wherein the dynamic brake armature is located radially outward from the static brake armature relative to the rotor axis.

3. The brake assembly according to claim 1, further comprising a dynamic brake pad located between the housing and the dynamic armature and a parking brake pad located between the static brake armature and the rotor.

4. The brake assembly according to claim 1, further comprising:
   a dynamic brake pad located between and secured to one of the dynamic brake armature and the housing;
   a first static brake pad located between and secured to one of the rotor and the static brake armature;
   a forward plate located on a forward side of the rotor opposite the housing, the forward plate being stationarily secured to the housing;
   a second static brake pad located between and secured to one of the rotor and the forward plate; and wherein the rotor and the housing are free to move axially a limited distance relative to each other.

5. The brake assembly according to claim 1 wherein the dynamic brake armature is secured to the rotor with a plurality of dowel pins and the static brake armature is secured to the housing with a plurality of dowel pins.

6. The brake assembly according to claim 1, further comprising a forward plate stationarily secured to a forward side of the housing, the brake rotor rotating between the forward plate and the housing and the rotor being free to move axially on the shaft a selected amount.

7. The brake assembly according to claim 1, further comprising means mounted to the housing for eliminating residual magnetic forces between the dynamic brake armature and the first coil after the first coil has been de-energized.

8. An electric brake assembly, comprising in combination:

a stationary housing;

a rotary shaft having an axis;

a brake rotor mounted on the rotary shaft for rotation therewith;

a forward plate stationarily secured to a forward side of the rotor opposite the housing, the brake rotor rotating between the forward plate and the housing, and the rotor being free to move a selected axial amount relative to the housing;

a static brake armature;

means for mounting the static brake armature to the housing to prevent rotation therebetween, but to allow axial movement of the static brake armature;

spring means between the housing and the static brake armature for urging the static brake armature away from the housing and against the rotor to frictionally engage the rotor and prevent rotation of the rotor, the rotor in turn being urged frictionally against the forward plate to prevent rotation of the rotor;

a dynamic brake armature;

means for mounting the dynamic brake armature to the rotor for rotation therewith, but to allow axial movement of the dynamic brake armature relative to the rotor and the housing;

an electromagnetic first coil mounted stationarily to the housing for drawing the dynamic brake armature frictionally against the housing when variably energized to apply a variable braking force to the rotor;

an electromagnetic second coil mounted stationarily to the housing for urging the static brake armature toward the housing when energized to compress the spring and pull the static brake armature away from the rotor; and means for selectively energizing the first coil and the second coil for providing a variable dynamic braking force when the first coil is energized, an absence of braking force when the first coil is de-energized and the second coil is energized, and a parking brake force when both of the coils are de-energized.

9. The brake assembly according to claim 8 wherein the dynamic brake armature is located radially outward from the static brake armature relative to the axis.

10. The brake assembly according to claim 8, further comprising a dynamic brake pad located between and secured to one of the housing and the dynamic armature; and a parking brake pad located between and secured to one of the static brake armature and the rotor.

11. The brake assembly according to claim 8, further comprising:

a dynamic brake pad located between and secured to one of the dynamic brake armature and the housing;

a first static brake pad located between and secured to one of the rotor and the static brake armature; and a second static brake pad located between and secured to one of the rotor and the forward plate.

12. The brake assembly according to claim 8, further comprising means mounted to the housing for eliminating residual magnetic forces between the dynamic brake armature and the first coil after the first coil has been de-energized.

13. An electric brake assembly, comprising in combination:

a stationary housing;

a rotary shaft having an axis;

a brake rotor mounted on the rotary shaft for rotation therewith;

a forward plate stationarily secured to a forward side of the housing, the brake rotor rotating between the forward plate and the housing and the rotor being free to move axially relative to the housing and the forward plate a selected amount;

a static brake armature secured to the housing with a plurality of static dowel pins to prevent rotation therebetween, the static brake dowel pins allowing the static brake armature to move axially relative to the housing;

a spring between the housing and the static brake armature for urging the static brake armature away from the housing and against the rotor, which in turn is urged against the forward plate to prevent rotation of the rotor relative to the housing;

a dynamic brake armature secured to the rotor with a plurality of dynamic brake dowel pins for rotation therewith, the dynamic brake dowel pins allowing the dynamic brake armature to move axially relative to the rotor and the housing, and the dynamic brake armature being located radially outward from the static brake armature;

a first electromagnetic coil stationarily mounted to the housing for drawing the dynamic brake armature frictionally against the housing when variably energized to apply a variable braking force to the rotor;

a second electromagnetic coil stationarily mounted to the housing for urging the static brake armature toward the housing when energized to compress the spring and pull the static brake armature away from the rotor and reduce pressure of the rotor against the forward plate;

a dynamic brake pad located between and secured to one of the dynamic brake armature and the housing;

a first static brake pad located between and secured to one of the rotor and the static brake armature;

a second static brake pad located between and secured to one of the rotor and the forward plate; and means for selectively energizing the first coil and the second coil for providing a variable dynamic braking force when the first coil is variably energized, an absence of braking force when the first coil is de-energized and the second coil is energized, and a parking brake force when both of the coils are de-energized.

14. The brake assembly according to claim 8, further comprising means mounted to the housing for eliminating residual magnetic forces between the dynamic brake armature and the first coil after the first coil has been de-energized.

* * * * *